United States Patent [19]

Yoshino

[11] Patent Number: 4,836,562
[45] Date of Patent: Jun. 6, 1989

[54] LAMINATED METALLIC GASKET

[75] Inventor: Nobuo Yoshino, Saitama, Japan

[73] Assignee: Nihon Metal Gasket Kabushiki Kaisha, Kumagaya, Japan

[21] Appl. No.: 238,924

[22] Filed: Aug. 31, 1988

[30] Foreign Application Priority Data

Sep. 5, 1987 [JP] Japan .................. 62-222258
Sep. 11, 1987 [JP] Japan .................. 62-227931

[51] Int. Cl.⁴ ............................. F16J 15/08
[52] U.S. Cl. ................ 277/235 B; 277/236
[58] Field of Search ............ 277/229, 234, 235 R, 277/235 A, 235 B, 236

[56] References Cited

U.S. PATENT DOCUMENTS

| 1,851,948 | 3/1932 | Summers . |
| 2,034,610 | 3/1936 | Dickson . |
| 2,397,597 | 4/1946 | Dunkle . |
| 3,567,234 | 3/1971 | Skrycki . |
| 3,738,558 | 6/1973 | Colwell . |
| 3,806,138 | 4/1974 | Herrington . |
| 4,468,044 | 8/1984 | Ulmer et al. . |
| 4,531,750 | 7/1985 | Herrington ............ 277/235 B |
| 4,619,459 | 10/1986 | Herrington ............ 277/235 B |

FOREIGN PATENT DOCUMENTS

| 2030487 | 1/1971 | Fed. Rep. of Germany . |
| 2717663 | 10/1978 | Fed. Rep. of Germany . |
| 59-90745 | 5/1984 | Japan . |
| 1370125 | 10/1974 | United Kingdom . |

Primary Examiner—Robert S. Ward
Attorney, Agent, or Firm—Flynn, Thiel, Boutell & Tanis

[57] ABSTRACT

A laminated metallic gasket provided with two base plates each made from an elastic metal plate and having an annular bead formed therein in surrounding relationship to the combustion chamber hole. An intermediate constituent member is interposed between the two base plates and, directly adjacent and surrounding the combustion chamber hole, is provided with a compensating bent portion which is bent backwardly so as to radially overlap itself so that the constituent member is of increased axial thickness directly adjacent the combustion chamber hole.

2 Claims, 5 Drawing Sheets

LAMINATED METALLIC GASKET

FIELD OF THE INVENTION

This invention relates to an improved laminated metallic gasket for sealing engagement in surrounding relation to a combustion chamber hole.

BACKGROUND OF THE INVENTION

Metallic gaskets are commonly utilized at the joint between members to be joined, for example, cylinder heads and cylinder blocks which constitute pars of internal combustion engines. Such a metallic gasket has beads which are formed to seal the deck surfaces of the cylinder head and the cylinder block, and the beads form elastic seal lines on the deck surfaces owing to the tightening forces of tightening means such as tightening bolts for uniting the members to be joined, to provide a sealing effect.

In recent years, reduction in weight, improvement in performance, and improvement in economy have been desired in the field of internal combustion engines, and there have been demands for the development of internal combustion engines having increased durability. Since internal combustion engines are commonly used over a long period of time, they are frequently exposed to thermal deformation, expansion, contraction or the like. Therefore, metallic gaskets which can withstand thermal deformation due to the internal combustion engines have been desired as metallic gaskets for sealing the joints between cylinder heads and cylinder blocks. For these reasons, Applicant developed the gasket of copending U.S. Ser. No. 07/114,699, U.S. Pat. No. 4,799,695, which gasket is an attempt to improve durability. The gasket of this application has an intermediate plate and a compensation plate which are superimposed to constitute an intermediate constituent member, with a peripheral edge portion of the compensation plate adjacent to a combustion chamber hole being bent to form a compensation portion, and base plates each having a bead respectively disposed adjacent the surface of the intermediate plate and the surface of the compensation plate.

When a cylinder head is fastened to the cylinder block by tightening bolts with a metallic gasket interposed therebetween, the cylinder head is curved by the bolt tightening force and, in particular, the space between the cylinder head and the cylinder block around the combustion chamber increases. As a result, distortion may occur.

In such a metallic gasket, the peripheral edge portion of the compensation plate that is adjacent to the combustion chamber hole is only bent toward the intermediate plate so as to form the compensation portion. Therefore, the function of the compensation portion, that is, its stopper function, does not sufficiently work upon the bead of the base plate which is disposed on the side on which the peripheral edge portion of the compensation plate that is adjacent to the combustion chamber hole. For this reason, when in use, the beads may undergo knocking by the influence of explosive force or the heat of an internal combustion engine, with the result that their spring characteristics may deteriorate to cause lowering in the sealing properties and durability.

Also, in such a metallic gasket, the beads formed on the two superimposed base plates have the same bead height. Accordingly, the bead of the base plate disposed on the side on which the peripheral edge portion of the compensation plate which constitutes a portion of the intermediate constituent member, that is, the bent peripheral portion which is not located adjacent to the combustion chamber hole is depressed to an excessive extent. As a result, the spring forces of the base plates non-uniformly act upon the bead portions, so that uniform sealing pressure cannot be obtained at each of the deck surfaces. Therefore, sealing properties deteriorate, and the beads of the base plates are permanently set due to their fatigue resulting from excessive depression. This may incur a deterioration in durability.

It is therefore an object of the present invention to provide a laminated metallic gasket in which a compensation bent portion is formed in an intermediate constituent member so that a first step formed between one surface of a bent peripheral edge portion of the intermediate constituent member that is adjacent to the combustion chamber hole and one surface of the intermediate constituent member is made approximately equal to a second step formed between the other surface of the bent peripheral edge portion of the intermediate constituent member that is adjacent to the combustion chamber hole and the other surface of the intermediate constituent member, whereby the compensation portion can provide a sufficient compensation effect upon the beads of the respective base plates which are laminated on the intermediate constituent member so as to protect the beads, thereby preventing a lowering in spring characteristics of the beads and enhancing sealing properties as well as durability.

It is also an object of the present invention to provide a laminated metallic gasket in which the bead height of the bead of a base plate disposed on the side on which is located the peripheral edge portion of an intermediate constituent member which is bent to form a compensation portion adjacent to a combustion chamber hole is larger by a predetermined amount than the bead height of the bead of a base plate located on the other side of the intermediate constituent member, whereby the spacing between deck surfaces created around the combustion chamber is compensated for and a deterioration in the function of the beads is prevented and whereby the spring force of each of the base plates at the bead portion is made uniform to improve sealing properties and durability and, in addition, it is possible to easily alter the spring characteristics of the base plates.

To achieve this object, in accordance with the present invention, there is provided a laminated metallic gasket provided with two base plates each made from an elastic metal plate on which a bead is formed such as to surround a combustion chamber hole, an intermediate constituent member being interposed between the two base plates, characterized in that the beads of the respective base plates are disposed symmetrically with respect to the intermediate constituent member, a peripheral edge portion of the intermediate constituent member that is adjacent to the combustion chamber hole being bent to form a compensation portion having a predetermined thickness, and a compensation bent portion being formed in the intermediate constituent member so that a first step formed between one surface of the bent peripheral edge portion of the intermediate constituent member that is adjacent to the combustion chamber hole and one surface of the intermediate constituent member is made approximately equal to a second step formed between the other surface of the bent peripheral edge portion of the intermediate constituent member that is adjacent to the combustion chamber hole and the other surface of the intermediate constituent member.

To also achieve this object, the present invention provides a laminated metallic gasket provided with two base plates each made from an elastic metal plate on which a bead is formed such as to surround a combustion chamber hole, an intermediate constituent member being interposed between the two base plates, characterized in that a peripheral edge portion of the intermediate constituent member that is adjacent to the combustion chamber hole is bent and radially overlapped relative to the peripheral edge portions of the two base plates that are adjacent to the combustion chamber hole to form a compensation portion having a predetermined thickness, the bead height of a bead of one of the base plates disposed on the side on which is located the peripheral edge portion of the intermediate constituent member which is bent to form the compensation portion adjacent to the combustion chamber hole being larger by a predetermined amount than the bead height of a bead of the other located on the other side of the intermediate constituent member.

In the arrangement of the present invention, for the purpose of compensation for the clearance which is created around the combustion chamber between the deck surfaces of the cylinder head and the cylinder block, the peripheral edge portion of the intermediate constituent member that is adjacent to the combustion chamber hole is bent to form the compensation portion which is thicker than the bead portion in the vicinity of the combustion chamber hole. In addition, the first step formed between one surface of the bent peripheral edge portion of the intermediate constituent member that is adjacent to the combustion chamber hole and one surface of the intermediate constituent member is approximately equal to the second step formed between the other surface of the bent peripheral edge portion of the intermediate constituent member that is adjacent to the combustion chamber hole and the other surface of the intermediate constituent member. Accordingly, the beads of the respective base plates which are laminated on the intermediate constituent member can be protected by the compensation portion, so that a deterioration in their spring characteristics is inhibited to enhance sealing properties and durability.

In accordance with the arrangement of the present invention, when the laminated metallic gasket inserted into a joint undergoes deformation due to compression, the bead of the base plate disposed on the side on which is located the peripheral edge portion of the intermediate constituent member which is bent to form the compensation portion adjacent to the combustion chamber hole is prevented from being deformed due to compression by virtue of the peripheral edge portion of the intermediate constituent member that is adjacent to the combustion chamber hole. Since the amount of deformation of a smaller bead of the base plate disposed on the other side of the intermediate constituent member is small, the spring force of each of the base plates at the bead portions is made uniform to uniformly seal the entire sealing surfaces, thereby improving sealing properties and durability. In addition, a deterioration in the function of the bead of each of the base plates can be prevented to improved durability.

DETAILED DESCRIPTION

Figure 1:
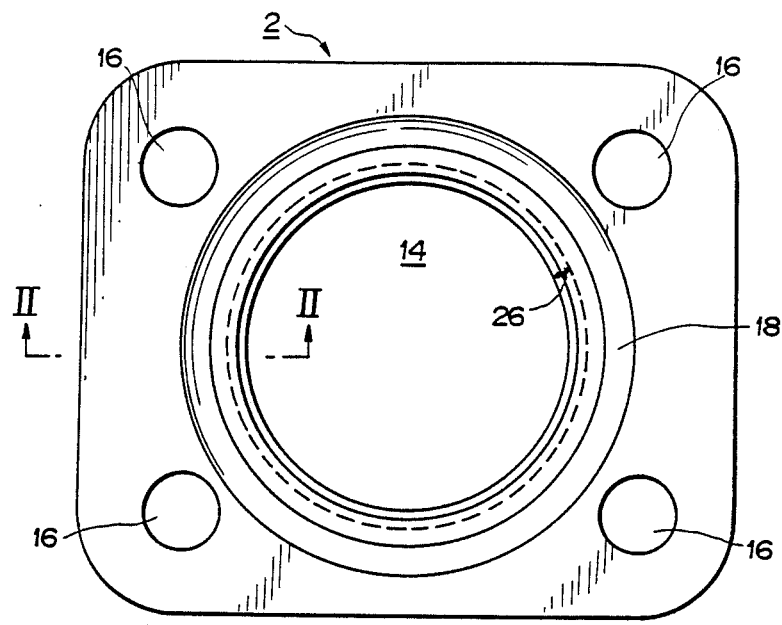
FIG. 1 is a plan view of a laminated metallic gasket according to a first embodiment of the invention.
Figure 2:
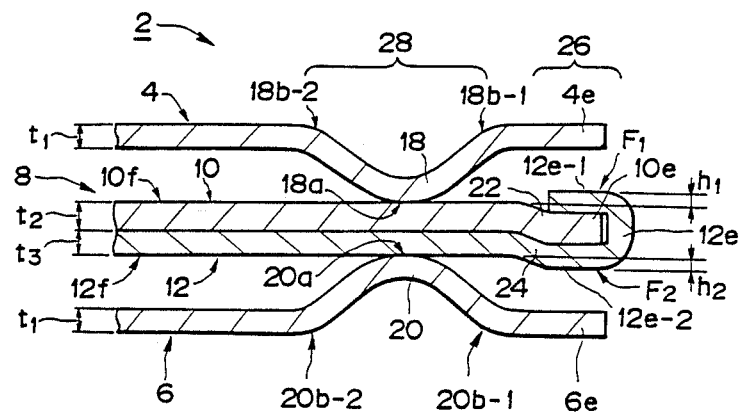
FIG. 2 is an enlarged sectional view, of the essential portion as taken along line II—II of FIG. 1.
Figure 3:
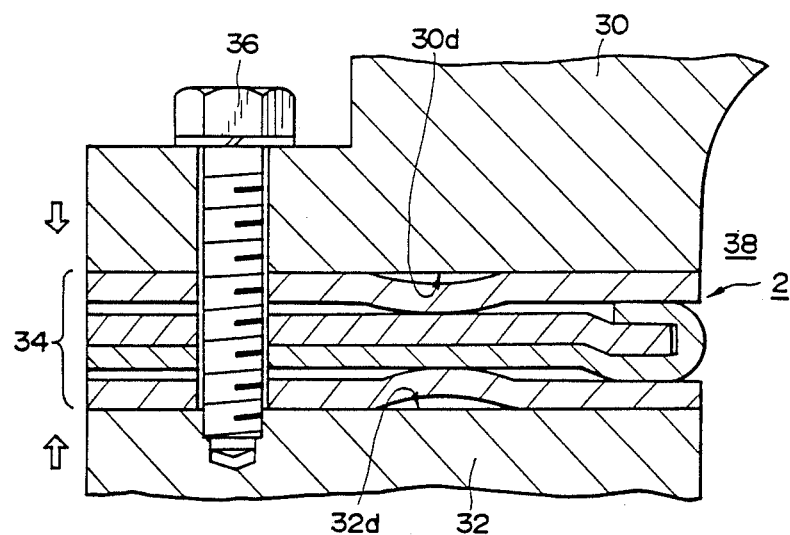
FIG. 3 is an enlarged sectional view, with parts omitted, illustrating the state wherein the laminated metallic gasket of FIG. 1 is inserted into a joint.

FIGS. 1 to 3 illustrate a first embodiment of the present invention.

As illustrated, 2 designates a laminated metallic gasket. The laminated metallic gasket 2 is composed of a first base plate 4, a second base plate 6, and an intermediate constituent member 8 interposed therebetween. The intermediate constituent member 8 is constituted by an intermediate plate 10 which is laminated on a compensation plate 12. Each of the first and second base plates 4 and 6 is made from an elastic metallic plate having a plate thickness $t_1$. The intermediate plate 10 is constituted by a metal plate having a plate thickness $t_2$ and the compensation plate 12 is constituted by a metal plate having a plate thickness $t_3$.

The first and second base plates 4 and 6, the intermediate plate 10, and the compensation plate 12 are combined in the form of superimposed layers. A combustion chamber hole 14 is formed in each of the plates 4, 6, 10, and 12. A plurality of bolt holes 16 are formed in the laminated metallic gasket 2 around the combustion chamber hole 14, which bolt holes 16 each receive a fastening bolt 36 serving as a fastening means as described later.

A first bead 18 is formed in the first base plate 4 in such a manner as to surround the combustion chamber hole 14. A second bead 20 having the same shape as the first bead 18 is formed in the second base plate 6 in such a manner as to surround the combustion chamber hole 14.

In FIG. 2, a compensation peripheral edge portion 12e of the compensation plate 12 that is adjacent to the combustion chamber hole 14 is bent axially to the side on which intermediate plate 10 is located. In this manner, a first compensation peripheral edge portion 12e-1 is radially overlapped on a radially inner peripheral edge portion 10e of the intermediate plate 10, which portion 10e is adjacent to the combustion chamber hole 14. A second compensation peripheral edge portion 12e-2 is located on the side on which the second base plate 6 is located. A first step $h_1$ is formed between a face $F_1$ of the first compensation portion 12e-1 and a face 10f of the intermediate plate 10 (which face 10f constitutes one surface of the intermediate constituent member 8), and a second step $h_2$ is formed between a face $F_2$ of the second step-shaped compensation peripheral edge portion 12e-2 and a face 12f of the intermediate plate 12 (which face 12f constitutes the other surface of the intermediate constituent member 8). The first step $h_1$ and second step $h_2$ have substantially the same form. Thus, a first compensating bent portion 22 and a second compensating bent portion 24 are formed in the intermediate plate 10 and the compensation plate 12, respectively. Therefore, the face $F_1$ of the first compensation portion 12e-1 is formed to be higher than the face 10f of the intermediate plate 10 by a portion of the first step $h_1$. The face $F_2$ of the second compensation peripheral edge portion 12e-2 is formed to be higher than the face 12f of the intermediate plate 12 by a portion of the second step $h_2$.

Furthermore, the first base plate 4 having the first bead 18 is arranged so that the vertex 18a of the bead 18 may come into contact with the face 10 and so that bases 18b-1 and 18b-2 may come into contact with a deck surface 30d of a cylinder head 30 as shown, for example, in FIG. 3.

The second base plate 6 is arranged so that the second bead 20 is substantially axially aligned with the first bead 18, and the vertex 20a of the second bead 20 may come into contact with the face 12f and the bases 20b-1 and 20b-2 may come into contact with a deck surface 32d of the cylinder block 32 as shown in FIG. 3. Thus, the first and second base plates 4 and 6 are arranged symmetrically with respect to the intermediate plate 10 and the compensation plate 12. Therefore, the combustion chamber hole 14 in the laminated metallic gasket 2 is surrounded by a compensation portion 26 having the maximum thickness which is constituted by a first peripheral edge portion 4e of the first base plate 4, a second peripheral edge portion 6e of the second base plate 6, the intermediate peripheral edge portion 10e of the intermediate plate 10, and the first and second grommet-like compensation peripheral edge portions 12e-1 and 12e-2 of the compensation plate 12. More specifically, the compensation portion 26 is formed directly adjacent to the combustion chamber hole 14 and radially inward of the bead portion 28 which includes the first and second beads 18 and 20. The thickness of the compensation portion 26 is selected to be greater than the thickness obtained when the plates 4, 6, 10 and 12 are superimposed, as well as a little greater than the clearance between opposing deck surfaces around the combustion chamber 38 created when the cylinder head 30 and cylinder block 32 are fastened by the fastening bolt 36. More specifically, the compensation portion 26 is made thicker by an amount equivalent to the thickness of the first compensation peripheral edge portion 12e-1 as compared with the thickness obtained when the plates 4, 6, 10 and 12 are superimposed at portions other than the compensation portion 26. This ensures that the clearance between the deck surfaces 30d and 32d around the combustion chamber 38 is compensated for.

When the plates 4, 6, 10 and 12 are to be integrally joined together, for example, cylindrical hollow fastening members (not shown) are inserted into the respective bolt holes 16, and the opposite ends of the fastening members are bent and superimposed on the first base plate 4 and the second base plate 6 in a pinched manner. Alternatively, the radially outer peripheral edge portions of the plates 4, 6, 10 and 12 may be partially projected and the projecting portions may be joined together by spot welding or riveting.

The operation of the first embodiment is described below.

The laminated metallic gasket 2 is inserted into the joint portion 34 in such a manner that the bases 18b-1 and 18b-2 of the first bead 18 are kept in contact with the deck 30d of the cylinder head 30 with the bases 20b-1 and 20b-2 of the bead 20 being kept in contact with the deck surface 32d of the cylinder block 32. The laminated metallic gasket 2 is compressed by the tightening forces of the bolts 36 and thus the first and second beads 18 and 20 are reduced in height and deformed under compression. At this time, the height of the first and second beads 18 and 20 are progressively reduced by the tightening forces of the bolts 36. However, the first (i.e., radially inner) peripheral edge portion 4e of the first base plate 4 is brought into contact with the face $F_1$ of the first compensation peripheral edge portion 12e-1 while the second (i.e., radially inner) peripheral edge portion 6e of the second base plate 6 is brought into contact with the other face $F_2$ of the second compensation peripheral edge portion 12e-2. Therefore, a further compression of the first and second beads 18 and 20 is inhibited, that is, a further deformation of the same beads 18 and 20 due to compression is suppressed and therefore the first and second beads 18 and 20 are prevented from being totally flattened.

If the tightening bolts 36 are further tightened, the cylinder head 30 undergoes distortion due to a deficiency of rigidity of the internal combustion engine with respect to the bolt tightening forces. This may cause the problem that the clearance between the deck surfaces around the combustion chamber 38 is enlarged. However, as described previously, the compensation portion 26 is formed nearer to the combustion chamber hole 14 than the bead portion 28. Therefore, the thickness of the compensation portion 26 ensures that the enlarged clearance due to the distortion of the cylinder head 30 can be positively compensated for. At this time, the laminated metallic gasket 2 is compressed, and the thickness of the compensation portion 26 is slightly reduced as compared with the previous thickness of the same portion 26 when the laminated metallic gasket 2 is not tightened.

The first and second beads 18 and 20 are respectively held by the first and second compensation peripheral edge portions 12e-1 and 12e-2 which project by approximately the same height so that knocking is prevented from acting upon the first and second beads 18 and 20 to inhibit the lowering of their spring characteristics. It thus becomes possible to efficiently inhibit leakage of combustion gases from the combustion chamber 38. The provision of the compensation portion 26 prevents the deck surfaces from being expanded or contracted by the influence of engine heat or combustion gas pressure. In addition, the compensation portion 26 reduces an alternating load due to knocking which acts upon the first and second beads 18 and 20 to effectively prevent the first and second beads 18 and 20 from being permanently set due to fatigue. Therefore, it is possible to prevent the breakage or damage of the tightening bolt 36 and the cylinder head 30 engaged with the tightening bolt 36 and to prevent a reduction in the tightening force of the tightening bolt 36, whereby a stable sealing effect can be achieved.

Furthermore, in this embodiment, the first and second beads 18 and 20 are disposed symmetrically with respect to the intermediate plate 10 and the compensation plate 12. This increases the amount of restoration and restoring force of the bead portion 28 and hence improves the sealing effect at the portion 28. Accordingly, the periphery of the combustion chamber 38 is sealed at two positions thereof by the compensation portion 26 and the bead portion 28, whereby a further enhanced sealing effect can be obtained and leakage of combustion gases is efficiently prevented.

In addition, if it is desired to change the thickness of the compensation portion 26, all that is required is to alter the thickness of the intermediate plate 10 or the thickness of the peripheral edge portion 12e of the compensation plate 12. This makes it easy to change the thickness, and hence to produce the laminated metallic gasket 2.

Figure 4:
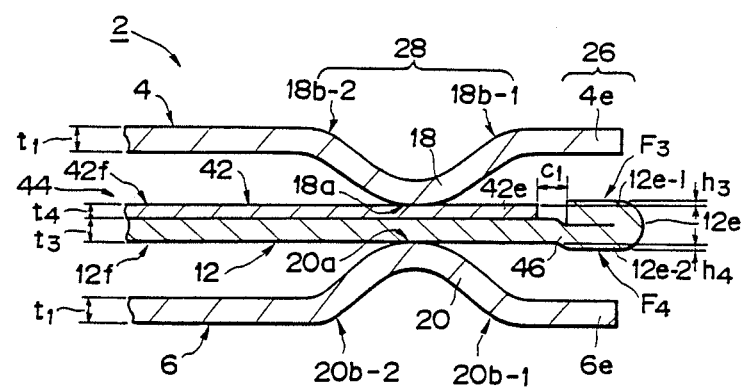
FIG. 4 is an enlarged sectional view of the essential portion of a laminated metallic gasket according to a second embodiment of the invention.

FIG. 4 illustrates a second embodiment of the present invention. In the following description of the second embodiment, the same reference numerals are used to denote the portions which have the same functions as those of the first embodiment described above.

The feature of the second embodiment resides in the following points. Specifically, an intermediate plate 42 is superimposed on the compensation plate 12 having a thickness $t_3$, the intermediate plate 42 having a thickness $t_4$ smaller than the thickness $t_3$. The intermediate plate 42 and the compensation plate 12 constitute an intermediate constituent member 44. The compensation plate 12 has the compensation peripheral edge portion 12e is bent and overlapped on its surface on which the intermediate plate 42 is superimposed, but edge portion 12e does not overlap on the peripheral edge portion 42e of the intermediate plate 42. In other words, the end surface of the first compensation peripheral edge portion 12e-1 is spaced apart by a predetermined distance $C_1$ from the end surface of the peripheral edge portion 42e of the intermediate plate 42 that is nearest to the combustion chamber hole 12. In addition, a first step $h_3$ is formed between a surface 42f of the intermediate plate 42 which constitutes one surface of the intermediate constituent member 44 and a face $F_3$ of the first compensation peripheral edge portion 12e-1, and a second step $h_4$ is formed between the surface 12f of the compensation plate 12 which constitutes the other surface of the intermediate constituent member 44 and a face $F_4$ of the second compensation peripheral edge portion 12e-2. A compensation bent portion 46 being formed so that the first step $h_3$ and the second step $h_4$ may approximately equal each other.

The construction of the second embodiment produces the same effects as the first embodiment described previously. The thickness of the bead portion 28 and the compensation portion 26 of the laminated metallic gasket 2 can be varied by changing the thickness $t_4$ of the intermediate plate 42 and/or the thickness $t_3$ of the compensation plate 12. Therefore, facial sealing pressure which is made to act upon the deck surfaces 30d and 32d can be easily changed as required in accordance with the thickness of the compensation plate 26. Since all that is required is to form the compensation bent portion 46 in the compensation plate 12, it is possible to easily produce the laminated metallic gasket 2.

Figure 5:
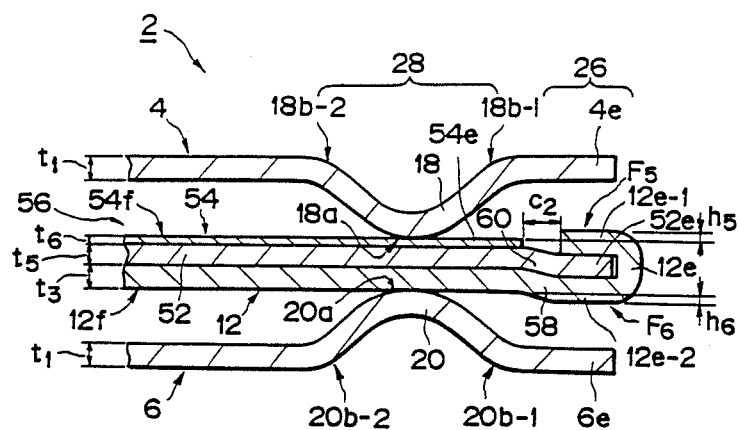
FIG. 5 is an enlarged sectional view of the essential portion of a laminated metallic gasket according to a third embodiment of the invention.

FIG. 5 illustrates a third embodiment of the present invention.

The feature of the third embodiment resides in the following points. Specifically, a first intermediate plate 52 having a thickness $t_5$ is superimposed on the compensation plate 12 having a thickness $t_3$, and a second intermediate plate 54 having a lesser thickness $t_6$ is superimposed on the first intermediate plate 52, thereby constituting an intermediate constituent member 56. The compensation peripheral edge portion 12e of the compensation plate 12 is bent to the side on which the first and second intermediate plates 52 and 54 are located but is not overlapped on the inner peripheral edge portion 54e of the second intermediate plate 54. In other words, the end surface of the first compensation peripheral edge portion 12e-1 is spaced apart by a predetermined distance $C_2$ from the end surface of the peripheral edge portion 54e of the second intermediate plate 54, with the first compensation peripheral edge portion 12e-1 being superimposed (i.e., overlapped) on the first (i.e., radially inner) peripheral edge portion 52e of the first intermediate plate 52. In addition, a first step $h_5$ is formed between a surface 54f of the second intermediate plate 54 which constitutes one surface of the intermediate constituent member 56 and a face $F_5$ of the first compensation peripheral edge portion 12e-1, and a second step $h_6$ is formed between the surface 12f of the compensation plate 12 which constitutes the other surface of the intermediate constituent member 56 and a face $F_6$ of the second compensation peripheral edge portion 12e-2. A compensation bent portion 58 and a first intermediate compensation bent portion 60 are formed so that the first step $h_5$ and the second step $h_6$ may be approximately equal.

The compensation plate 12, the first intermediate plate 52 and the second intermediate plate 54 are made of material which is softer than that of the first and second base plates 4 and 6.

The construction of the third embodiment produces the same effects as the first embodiment described previously. Since the vertexes 18a and 20a of the first and second beads 18 and 20 are respectively brought into contact with the second intermediate plate 54 and the compensation plate 12, the vertexes 18a and 20a are prevented from being damaged or abraded to provide protection of the first and second beads 18 and 20, so that the lifetime of the gasket can be extended.

Figure 6:
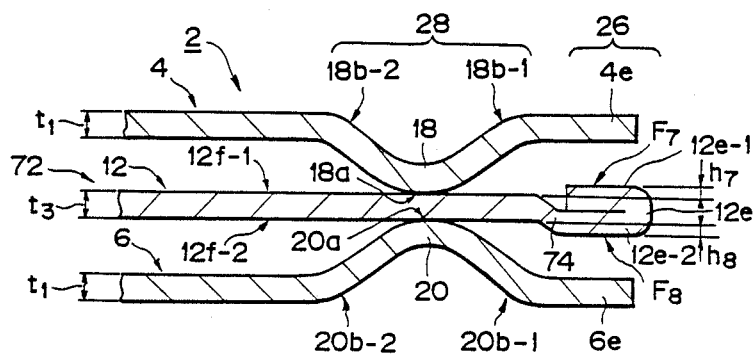
FIG. 6 is an enlarged sectional view of the essential portion of a laminated metallic gasket according to a fourth embodiment of the invention.

FIG. 6 shows a fourth embodiment of the present invention.

The feature of the fourth embodiment resides in the following points. Specifically, an intermediate constituent member 72 is constituted by a single compensation plate 12 having a thickness $t_3$. The compensation peripheral edge portion 12e of the compensation plate 12 that is adjacent to the combustion chamber hole 14 is bent back on itself to form the compensation portion 26, and a compensation bent portion 74 is formed in the compensation plate 12 so that a first step $h_7$ formed between a surface 12f-1 of the compensation plate 12 which Constitutes one surface of the intermediate constituent member 72 and a face $F_7$ of the first compensation peripheral edge portion 12e-1 is made approximately equal to a second step $h_8$ formed between a surface 12f-2 of the compensation plate 12 which constitutes the other surface of the intermediate constituent member 72 and a face $F_8$ of the second compensation peripheral edge portion 12e-2.

The construction of the fourth embodiment produces the same effects as the first embodiment described previously. Since the intermediate constituent member 72 is constituted by the single compensation plate 12, it is possible to simplify the construction of the laminated metallic gasket 2.

Figure 7:
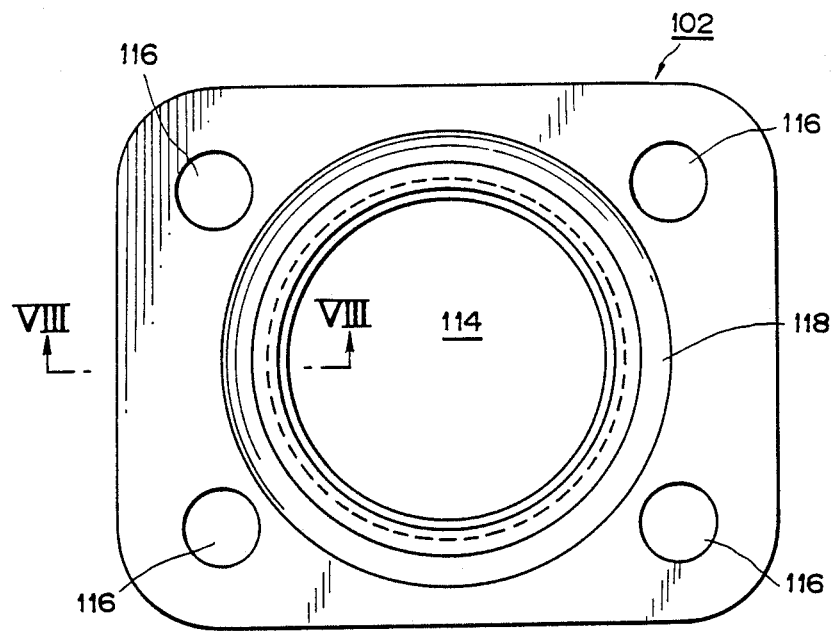
FIG. 7 is a plan view of a laminated metallic gasket according to a fifth embodiment.
Figure 8:
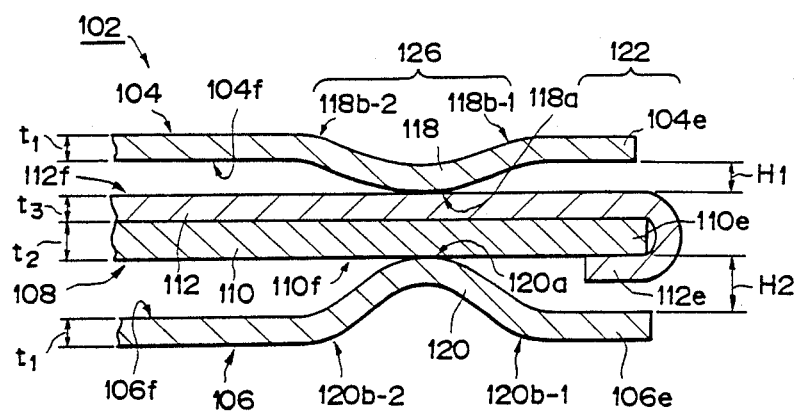
FIG. 8 is an enlarged sectional view, taken along the line VIII—VIII of FIG. 7, of the essential portion.
Figure 9:
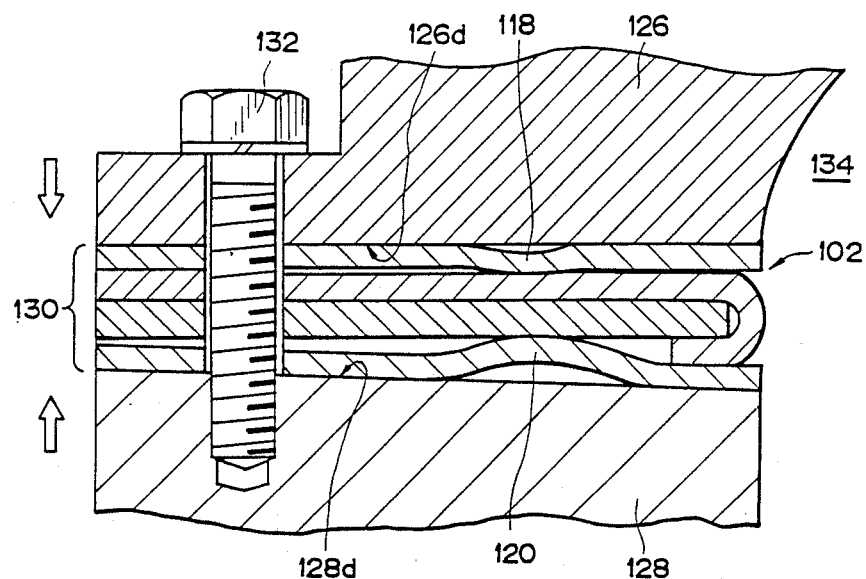
FIG. 9 is an enlarged sectional view, with parts omitted, illustrating the state wherein the laminated metallic gasket of FIG. 7 is inserted into a joint.

FIGS. 7 to 9 illustrate a fifth embodiment of the present invention. As illustrated, 102 designates a laminated metallic gasket composed of a first base plate 104, a second base plate 106, and an intermediate constituent member 108 interposed therebetween. The intermediate constituent member 8 is constituted by an intermediate plate 110 and a compensation plate 112. Each of the first and second base plates 104 and 106 is made from an elastic metallic plate having a plate thickness $t_1$. The intermediate plate 110 is constituted by a metal plate having a plate thickness $t_2$ and the compensation plate 112 is constituted by a metal plate having a plate thickness $t_3$.

The first and second base plates 104 and 106, the intermediate plate 110, and the compensating plate 112 are combined in the form of superimposed layers. A combustion chamber hole 114 is formed in each of these plates. A plurality of bolt holes 116 are formed around the combustion chamber hole 114, which bolt holes 116 each receive a fastening bolt 132 serving as a fastening means.

As shown in FIG. 8, the compensation plate 112 has a compensation peripheral edge portion 112e which surrounds the combustion chamber hole 114 and is bent axially to the side on which the intermediate plate 110 is located, that is, the side on which the second base plate 106 is located. Thus, the compensation peripheral edge portion 112e is made to radially overlap the inner peripheral edge portion 110e of the intermediate plate 110 which faces the combustion chamber hole 114.

The first bead 118 is formed on the first base plate 104 and surrounds the combustion chamber hole 114. The first bead 118 is formed so that, when it is not compressed, a vertex 118a thereof projects by a height H1, that is, the distance between the vertex 118a and a surface 104f of the first base plate 104 which opposes the compensation plate 112 equals the bead height H1. A second bead 120 is formed on the second base plate 106 and surrounds the combustion chamber hole 114. The second bead 120 is formed so that, when it is not compressed, a vertex 120a thereof projects by a height H2 from a surface 106f of the second base plate 106 which opposes the intermediate plate 110. The bead height H2 is greater than the bead height H1 by a predetermined amount, that is, by a distance equivalent to the thickness of the compensation peripheral edge portion 112e.

The first base plate 104 is arranged so that the vertex 118a of the first bead 118 may come into contact with a surface 112f of the compensation plate 112 and so that bases 118b-1 and 118b-2 may come into contact with a deck surface 126d of a cylinder head 126 as shown, for example, in FIG. 9.

The second base plate 106 superimposed on a surface 110f of the intermediate plate 110 is arranged so that the vertex 120a of the second bead 120 may come into contact with the surface 110f of the intermediate plate 110 and so that bases 120b-1 and 120b-2 may come into contact with a deck surface 128d of the cylinder block 128 shown in FIG. 9. More specifically, the beads 118 and 120 are axially aligned so that the vertex 118a of the first base plate 104 is brought into contact with the surface 112f of the compensation plate 112 and the vertex 120a of the second base plate 106 is brought into contact with the surface 110f of the intermediate plate 110, and the first and second base plates 104 and 106 are arranged symmetrically with respect to the compensation plate 112 and the intermediate plate 110. Therefore, the combustion chamber hole 114 in the laminated metallic gasket 102 is surrounded by a compensation portion 122 having a maximum thickness constituted by a first peripheral edge portion 104e of the first base plate 104, a second peripheral edge portion 106e of the second base plate 106, the intermediate peripheral edge portion 110e of the intermediate plate 110, the thickness of the plate 112, and the bent compensation peripheral edge portion 112e. More specifically, the compensation portion 122 is formed adjacent to the combustion chamber hole 114 inward of a bead portion 124 at which the first and second beads 118 and 120 are located. The thickness of the compensation portion 122 is selected to be greater than the thickness obtained when the first base plate 104, the second base plate 106, the intermediate base plate 110 and the compensation plate 112 are superimposed, as well as a little greater than the clearance which is created between opposing deck surfaces around the combustion chamber 134 when the cylinder head 126 and the cylinder block 128 are fastened by a fastening bolt 126. More specifically, the compensation portion 122 is made thicker by an amount equivalent to the thickness of the compensation peripheral edge portion 112e as compared with the thickness obtained when the first and second base plates 104 and 106, the intermediate plate 110 and the compensation plate 112 are superimposed at portions other than the compensation portion 122. This ensures that the clearance around the combustion chamber 134 between deck surfaces 126d and 128d is compensated for.

When the first base plate 104, the second base plate 106, the intermediate plate 110, and the compensation plate 112 are to be integrally joined together, for example, cylindrical hollow fastening members (not shown) are inserted into the respective bolt holes 116, and the opposite ends of the fastening members are bent and superimposed on the first base plate 104 and the second base plate 106 in a pinched manner. Alternatively, the outer peripheral edge portions of the first base plate 104, the second base plate 106, the intermediate plate 110 and the compensation plate 112 are partially projected and the projecting portions joined together by spot welding or riveting.

In FIG. 9, 126 and 128 respectively designate a cylinder head and a cylinder block which constitute a part of an internal combustion engine. The laminated metallic gasket 102 is inserted into a joint portion 130 between the deck surface 126d of the cylinder head 126 and the deck surface 128d of the cylinder block 128, and is tightened by a tightening bolt 132. Incidentally, reference numeral 134 denotes a combustion chamber.

The operation of the fifth embodiment will be described below.

The laminated metallic gasket 102 is inserted into the joint 130 in such a manner that the bases 118b-1 and 118b-2 of the first bead 118 are kept in contact with the deck 126d of the cylinder head 126 with the bases 120b-1 and 120b-2 of the second bead 120 being kept in contact with the deck surface 128d of the cylinder block 128. The laminated metallic gasket 102 is compressed by the tightening forces of the bolts 132 and thus the first and second beads 118 and 120 are reduced in height and deformed under compression. At this time, the height of the second bead 120 is progressively reduced by the tightening forces of the tightening bolts 132 but, since the second peripheral edge portion 106e of the second base plate 106 is pressed against the compensation peripheral edge portion 112e, further compression of the second bead 120 is inhibited, that is, further deformation of the second bead 120 due to compression is suppressed. Flattening of the second bead 120 is prevented.

If the tightening bolts 132 are further tightened, the cylinder head 126 undergoes distortion due to a deficiency of rigidity of the internal combustion engine with respect to the bolt tightening forces. This may cause the problem that the clearance between the deck surfaces around the combustion chamber 134 is enlarged. However, as described previously, the compensation portion 122 is formed nearer to the combustion chamber hole 114 with respect to the bead portion 124. Therefore, the thickness of the compensation portion 122 ensures that the enlarged clearance due to the distortion of the cylinder head 126 can be positively compensated for. At this time, the laminated metallic gasket 102 is compressed, and the thickness of the compensation portion 122 is slightly reduced as compared with the previous thickness of the same when the laminated metallic gasket 102 is not tightened.

In the bead portion 124, since the height H2 of the second bead 120 is larger than the height H1 of the first bead 118, this enables the uniform distribution of the spring forces produced by the base plates 104 and 106.

As a result, the formation of the beads 118 and 120 in the bead portion 124 enables approximately equal pressure to be made to act upon the entire sealed surfaces including the deck surface 126d of the cylinder head 126 and the deck surface 128d of the cylinder block 128, whereby sealing properties can be improved. Even if the height of the first bead 118 decreases, the first bead 118 is not depressed to an excessive extent. Accordingly, it is possible to prevent the permanent set of the first bead 118 due to fatigue and to maintain the function of the first bead 118, whereby durability can be improved.

If the thickness of the compensation portion 122 varies depending upon the thickness of the compensation peripheral edge portion 112e of the compensation plate 112, the height H2 of the second bead 120 of the second base plate 106 may be changed and the height H1 of the first bead 118 of the first base plate 104 may be changed in accordance with the variance in the height H2 to provide equalization of the spring force of the first base plate 104 and the spring force of the second base plate 106. In this manner, it is possible to further stabilize sealing effect. Accordingly, the spring forces of the first base plate 104 and the second base plate 104 are varied by altering the bead heights of the first bead 118 and the second bead 120 in accordance with the thickness of the compensation peripheral edge portion 112e. It is therefore possible to easily change spring characteristics.

Furthermore, in the present embodiment, the first base plate 104 and the second base plate 106 are disposed symmetrically with respect to the intermediate plate 110 and the compensation plate 112. This increases the amount of restoration and restoring force of the bead portion 124 and hence improves the sealing effect at the portion 124. Accordingly, the periphery of the combustion chamber 134 is sealed at two positions thereof by the compensation portion 122 and the bead portion 124, whereby a further enhanced sealing effect can be obtained and leakage of combustion gases is efficiently prevented.

In addition, if it is desirable to change the thickness of the compensation portion 122, all that is required is to alter the thickness of the intermediate peripheral edge portion 110e of the intermediate plate 110 or the thickness of the compensation peripheral edge portion 112e of the compensation plate 112. This makes it easy to change the thickness, and hence to produce the laminated metallic gasket 102.

Figure 10:
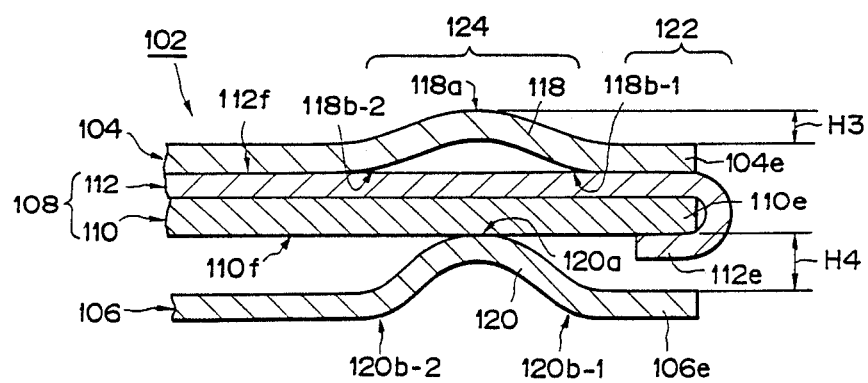
FIG. 10 is an enlarged sectional view of the essential portion of a laminated metallic gasket according to a sixth embodiment of the invention.

FIG. 10 illustrates a sixth embodiment of the present invention. In the following description of the sixth embodiment, portions which have the same functions as those of the fifth embodiment described above are designated by the same reference numerals.

The feature of the sixth embodiment resides in the following points. Specifically, the first base plate 104 is superimposed upon the compensation plate 112 so that the base portions 118b-1 and 118b-2 are brought into contact with the surface 112f of the compensation plate 112 which constitutes a part of the intermediate constituent member 108 and the second base plate 106 is superimposed on the intermediate plate 110 in the same manner as that of the fifth embodiment so that the vertex 120a of the second bead 120 may be brought into contact with the surface 110f of the intermediate plate 110 which constitutes a part of the intermediate constituent member 108. The vertex 118a of the first bead 118 and the vertex 120a of the second bead 120 are oriented in the same axial direction. A bead height H4 of the second bead 120 is larger by a predetermined amount than the height H3 of the first bead 118.

The construction of the sixth embodiment produces the same effects as the fifth embodiment described previously. Since all that is required is to orient the first bead 118 and the second bead 120 in the same direction, it is possible to easily produce the laminated metallic gasket 102.

The present invention is not limited to the embodiments described previously, and it is of course possible to employ a variety of modifications and applied forms.

In each of the embodiments described previously, for instance, for adjustment of the thickness of the compensation portion, plating, spraying or painting, may be applied to the peripheral edge portion of each of the first and second base plates, or a member made of metal or heat-resistant resin may be disposed on the same peripheral edge portion.

A compensation member having a thickness equivalent to the thickness of the compensation peripheral edge portion constituted by a bent periphery of the compensation plate may be fixed to the deck surfaces of the cylinder head or the cylinder block. Alternatively, an equivalent compensation member may be interposed between either of the deck surfaces and the base plate.

In addition, the bent compensation peripheral edge portion of the compensation plate need not necessarily be formed around the overall periphery of the combustion chamber. As required, a portion having a thickness equivalent to the thickness of the compensation peripheral edge portion may be partially formed around the periphery of the combustion chamber. In consequence, for example, point contact is achieved at bolt tightened portions while line contact is achieved at locations not adjacent to the bolt tightened portions, whereby sealing properties can be assured.

Moreover, the thickness of the bent compensation peripheral edge portion of the compensation plate may be, for example, reduced at the bolt tightened portions and increased at locations not adjacent to the bolt tightened portions in order to uniformly distribute facial pressure over the sealed surfaces to thereby improve sealing properties.

A plating or seal material may be coated over the obverse and reverse surfaces of the laminated metallic gasket, that is, the surface of the first base plate and the surface of the second base plate in order to compensate for irregular surfaces such as tool marks on the deck surfaces.

The width or height of each of the first and second beads can also be varied in accordance with the spacing between the deck surfaces.

For adjustment of the height of the compensation portion, the thickness of the intermediate constituent member, that is, the thickness of the peripheral edge portion of the compensation plate and the intermediate plate which faces the combustion chamber hole may be varied as occasion demands.

In each of the above embodiments wherein the intermediate constituent member is constituted by the intermediate plate and the compensation plate, the intermediate constituent member may be constituted by a single metal plate.

It will be appreciated from the foregoing that, in accordance with the present invention, the first step formed between one surface of the bent peripheral edge portion of the intermediate constituent member that is adjacent to the combustion chamber hole and one surface of the intermediate constituent member is made approximately equal to the second step formed between the other surface of the bent peripheral edge portion of the intermediate constituent member that is adjacent to the combustion chamber hole and the other surface of the intermediate constituent member. Therefore, the compensation portion can provide a sufficient compensation effect upon the beads of the respective base plates which are disposed on the opposite sides of the intermediate constituent member. It is accordingly possible to prevent the beads from being exposed to knocking due to exposure or the like and therefore to prevent a lowering in spring characteristics of the beads, whereby sealing properties and durability can be enhanced.

It will be appreciated from the foregoing that, in accordance with an embodiment of the present invention, the bead height of the bead of the base plate disposed on the side on which is located the peripheral edge portion of the intermediate constituent member which is bent to form the compensation portion adjacent to the combustion chamber hole is larger by a predetermined amount than the bead height of the bead of the base plate located on the other side of the intermediate constituent member. Therefore, the spacing between the deck surfaces created around the combustion chamber is compensated for, and a deterioration in the function of the beads is prevented. Thus, the spring force of each of the base plates at the bead portion is equally distributed to improve the sealing properties and durability. In addition, it is possible to easily alter the spring characteristics of the base plates.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A laminated metallic gasket provided with two base plates each made from an elastic metal plate on which a bead is formed so as to surround a combustion chamber hole, an intermediate constituent member interposed between said two base plates, characterized in that said beads of said respective base plates are disposed symmetrically with respect to said intermediate constituent member, a peripheral edge portion of said intermediate constituent member that is adjacent to said combustion chamber hole is bent to form a compensation portion having a predetermined thickness, and a compensation bent portion is formed in said intermediate constituent member so that a first step formed between one surface of the bent peripheral edge portion of said intermediate constituent member that is adjacent to said combustion chamber hole and one surface of said intermediate constituent member is made approximately equal to a second step formed between the other surface of said bent peripheral edge portion of said intermediate constituent member that is adjacent to said combustion chamber hole and the other surface of said intermediate constituent member.

2. A laminated metallic gasket provided with two base plates each made from an elastic metal plate on which a bead is formed so as to surround a combustion chamber hole, an intermediate constituent member being interposed between said two base plates, characterized in that a peripheral edge portion of said intermediate constituent member that is adjacent to said combustion chamber hole is bent so as to radially overlap peripheral edge portions of said two base plates that are adjacent to said combustion chamber hole to form a compensation portion having a predetermined thickness, the bead height of the bead of one of said base plates disposed on the side on which is located the peripheral edge portion of said intermediate constituent member which is bent to form said compensation portion adjacent to said combustion chamber hole being larger by a predetermined amount than the bead height of the bead of the other base plate located on the other side of said intermediate constituent member.

* * * * *

UNITED STATES PATENT AND TRADEMARK OFFICE
CERTIFICATE OF CORRECTION

PATENT NO. : 4,836,562
DATED     : June 6, 1989
INVENTOR(S) : Nobuo YOSHINO

It is certified that error appears in the above-identified patent and that said Letters Patent is hereby corrected as shown below:

On the title page, please cancel the drawing appearing thereon, and replace with the drawing reproduced below:

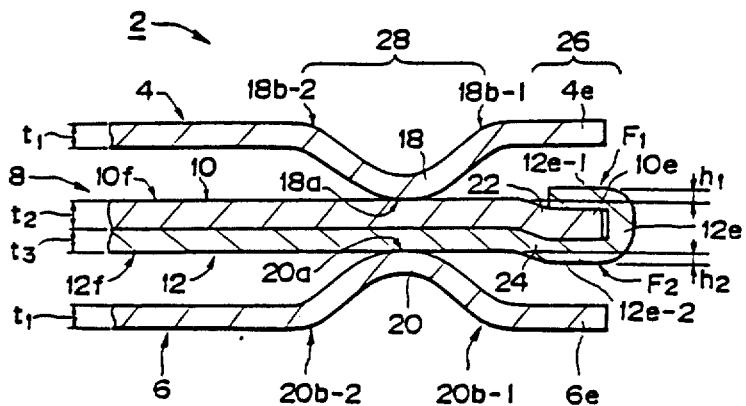

Signed and Sealed this

Eighth Day of May, 1990

*Attest:*

HARRY F. MANBECK, JR.

*Attesting Officer*     *Commissioner of Patents and Trademarks*